US012662394B2

(12) United States Patent
Wang et al.

(10) Patent No.: US 12,662,394 B2
(45) Date of Patent: Jun. 23, 2026

(54) FILTER ELEMENT ASSEMBLY AND WATER PURIFIER

(71) Applicant: FREUDENBERG APOLLO FILTRATION TECHNOLOGIES CO., LTD., Foshan (CN)

(72) Inventors: Liren Wang, Foshan (CN); Xiaochun Pi, Foshan (CN); Kaihua Xuan, Foshan (CN); Jingbin Pan, Foshan (CN); Feng Li, Foshan (CN)

(73) Assignee: FREUDENBERG APOLLO FILTRATION TECHNOLOGIES CO., LTD., Foshan (CN)

( * ) Notice: Subject to any disclaimer, the term of this patent is extended or adjusted under 35 U.S.C. 154(b) by 354 days.

(21) Appl. No.: 18/464,456

(22) Filed: Sep. 11, 2023

(65) Prior Publication Data

US 2023/0416114 A1 Dec. 28, 2023

Related U.S. Application Data

(63) Continuation of application No. PCT/CN2022/079483, filed on Mar. 7, 2022.

(30) Foreign Application Priority Data

Mar. 11, 2021 (CN) .......................... 202110266294.2

(51) Int. Cl.
 *C02F 1/00* (2023.01)
 *C02F 9/00* (2023.01)
(52) U.S. Cl.
 CPC ............... *C02F 1/001* (2013.01); *C02F 9/00* (2013.01); *C02F 2301/08* (2013.01)

(58) Field of Classification Search
 CPC ...... C02F 1/003; C02F 9/00; C02F 2201/003; C02F 2307/10
 See application file for complete search history.

(56) References Cited

U.S. PATENT DOCUMENTS

2021/0129051 A1 5/2021 Newton et al.

FOREIGN PATENT DOCUMENTS

CN 205461261 8/2016
CN 106184985 A * 12/2016 ............... A61L 9/00
(Continued)

OTHER PUBLICATIONS

Ling, Tong-qiang et al—CN106184985A machine translation—Dec. 7, 2016 (Year: 2016).*
(Continued)

*Primary Examiner* — Bradley R Spies
(74) *Attorney, Agent, or Firm* — Secant Intellectual Property Law

(57) ABSTRACT

A filter element assembly and a water purifier. The filter element assembly includes: a first housing having a first water port, a second water port, a third water port, and a fourth water port; a first filter element having a first water channel and a second water channel; a second housing; a second filter element, a third water channel and a fourth water channel being provided at an outer periphery and an inner periphery of the second filter element, respectively; a first pipeline connected between the third water port and a fifth water port and arranged in the second water channel; and a second pipeline connected between the fourth water port and a sixth water port arranged within the second water channel and spaced apart from the first pipeline.

18 Claims, 10 Drawing Sheets

(56) References Cited

FOREIGN PATENT DOCUMENTS

| CN | 205867676 | 1/2017 |
|---|---|---|
| CN | 107823956 | 3/2018 |
| CN | 107913540 | 4/2018 |
| CN | 207760072 | 8/2018 |
| CN | 110694330 | 1/2020 |
| CN | 111499023 | 8/2020 |
| CN | 211283909 | 8/2020 |
| CN | 112875901 | 6/2021 |
| CN | 214880628 | 11/2021 |
| CN | 215195647 | 12/2021 |
| CN | 215195654 | 12/2021 |
| CN | 215195693 | 12/2021 |
| CN | 215208772 | 12/2021 |
| KR | 10-2014-0025205 | 3/2014 |
| WO | 2018/129743 | 7/2018 |

OTHER PUBLICATIONS

Wang, Xu-ning et al—CN207760072U machine translation—Aug. 24, 2018 (Year: 2018).*

Yang, Hao et al—CN211283909U machine translation—Aug. 18, 2020 (Year: 2020).*

Rejection Decision from related Chinese Application No. 202110266294. 2, mailed Sep. 28, 2023. English translation attached.

International Search Report from corresponding PCT Appln. No. PCT/CN2022/079483,dated Jun. 8, 2022.

Written Opinion from corresponding PCT Appln. No. PCT/CN2022/ 079483,dated Jun. 6, 2022.

English translation of "Maintenance Manual for Commonly Used Instruments for Environmental Monitoring", dated Jun. 30, 1992, downloaded Jul. 11, 2023. Unable to determine other publication information.

First Office Action from related Chinese Appln. No. 202110266294. 2, dated Jun. 30, 2022. English translation attached.

Second Office Action from related Chinese Appln. No. 202110266294. 2, dated Mar. 7, 2023. English translation attached.

Third Office Action from related Chinese Appln. No. 202110266294. 2, dated Jul. 15, 2023. English translation attached.

* cited by examiner

100

100

70

73

70

80

FILTER ELEMENT ASSEMBLY AND WATER PURIFIER

CROSS-REFERENCE TO RELATED APPLICATIONS

This application is a continuation of International Application No. PCT/CN2022/079483 entitled "FILTER ELEMENT ASSEMBLY AND WATER PURIFIER" and filed on Mar. 7, 2022, which claims priority to Chinese patent Application No. 202110266294.2 entitled "FILTER ELEMENT ASSEMBLY AND WATER PURIFIER" and filed on Mar. 11, 2021, both of which are hereby incorporated by reference in their entireties.

FIELD

This disclosure relates to the field of filter element technology, in particular to a filter element assembly and a water purifier.

BACKGROUND

With the increasing awareness of environmental protection, energy conservation, and health, water purifiers have become important water purification tools in people's home lives. In order to improve the water purification effect of the water purifier and to ensure that the volume of the water purifier is not too large, the water purifier generally adopts a composite filter element.

In related art, the inlet and outlet water pipes of most of the composite filter elements adopt a form of a large pipe sleeved on a small pipe, forming a water path inside the small pipe and another water path between the large pipe and the small pipe, which can meet the water inflow and outflow requirements of the composite filter elements. However, it leads to complex production mold structures of the composite filter elements, too many assembly materials, and low production efficiency.

SUMMARY

The purpose of this disclosure is to address at least one of the technical problems existing in the related art. For this purpose, the present disclosure proposes a filter element assembly, the inlet and outlet water pipes of which are arranged side by side with intervals. In this way, it not only achieves a simple structure and a higher production efficiency for the filter element assembly, but also achieves a more compact structure of the filter element assembly.

The present disclosure further provides a water purifier.

The filter element assembly according to the present disclosure includes: a first housing having a first water port, a second water port, a third water port, and a fourth water port, wherein the third water port is spaced apart from the fourth water port; a first filter element arranged inside the first housing, a first water channel and a second water channel being provided at an outer periphery and an inner periphery of the first filter element respectively, wherein the first water channel is communicated with the first water port, and the second water channel is communicated with the second water port; a second housing arranged inside the first housing and arranged at an end of the first filter element that is away from the third water port and the fourth water port, the second housing having a fifth sixth water port and a sixth water port that are spaced apart from each other; a second filter element arranged inside the second housing, a third water channel and a fourth water channel being provided at an outer periphery and an inner periphery of the second filter element respectively, wherein the third water channel is communicated with the fifth water port, and the fourth water channel is communicated with the sixth water port; a first pipeline connected between the third water port and the fifth water port and arranged in the second water channel; and a second pipeline connected between the fourth water port and the sixth water port, wherein the second pipeline is arranged within the second water channel and is spaced apart from the first pipeline.

Therefore, by arranging the first pipeline and the second pipeline side by side and spaced apart in the second water channel, the structure and installation of the first pipeline and the second pipeline are simple and convenient so as to improve the assembly efficiency of the filter element assembly, and the structure of the filter element assembly can be more compact to improve the space utilization rate of the filter element assembly.

In some examples of the present disclosure, a distance between an axis of the first pipeline and an axis of the second pipeline is L1, and a distance between an axis of the third water port and an axis of the fourth water port is L2, where L1<L2.

In some examples of the present disclosure, the axis of the first pipeline is noncollinear with the axis of the third water port, and the axis of the first pipeline is closer to the axis of the second pipeline than the axis of the third water port; and/or the axis of the second pipeline is noncollinear with the axis of the fourth water port, and the axis of the second pipeline is closer to the axis of the first pipeline than the axis of the fourth water port.

In some examples of the present disclosure, the first housing is provided with a first connecting port at a position corresponding to the third water port and a second connecting port at a position corresponding to the fourth water port, with one end of the first pipeline arranged in the first connecting port and one end of the second pipeline arranged in the second connecting port, wherein a distance between an axis of the first connecting port and an axis of the second connecting port is L1.

In some examples of the present disclosure, the second housing is provided with a third connecting port at a position corresponding to the fifth water port and a fourth connecting port at a position corresponding to the sixth water port, with another end of the first pipeline arranged in the third connecting port and another end of the second pipeline arranged in the fourth connecting port.

In some examples of the present disclosure, the filter element assembly further includes a first end cover arranged at an end of the first filter element that is adjacent to the first water port and the second water port, wherein the first end cover has a first through hole and a second through hole at positions corresponding to the second water channel, the first pipeline passing through the first through hole and the second pipeline passing through the second through hole.

In some examples of the present disclosure, an inner tube is installed on the first end cover, the inner tube is hollow, and the first pipeline and the second pipeline are installed inside the inner tube.

In some examples of the present disclosure, a protruding limiting edge is provided at an outer periphery of an end of the second housing that faces the first filter element, the end of the first filter element being fixedly connected to a surface of the end of the second housing, and the outer periphery of the first filter element being fitted into the limiting edge.

In some examples of the present disclosure, a second end cover and a third end cover are provided within the second housing; the second end cover and the third end cover are arranged at two ends of the second filter element, respectively; a third positioning part is provided on the third end cover; a fourth positioning part is provided on the second housing; one of the third positioning part and the fourth positioning part is a positioning protrusion, and another one of the third positioning part and the fourth positioning part is a positioning groove; and the third end cover has through holes corresponding to the third connecting port and the fourth connecting port.

In some examples of the present disclosure, the first pipeline and the second pipeline have a same structure.

In some examples of the present disclosure, a connecting rib is connected between the first pipeline and the second pipeline, and the first pipeline, the second pipeline, and the connecting rib are integrally formed as one structural piece.

In some examples of the present disclosure, the first water port, the second water port, the third water port, and the fourth water port are spaced apart from one another at an axial end of the first housing, the first water port is spaced apart from the second water port in a first direction, and the third water port is spaced apart from the fourth water port in a second direction, with an included angle formed between the first direction and the second direction.

In some examples of the present disclosure, the included angle is 90°.

In some examples of the present disclosure, a first sealing ring is provided on each of two ends of the first pipeline, and the first sealing ring is sleeved on the end of the first pipeline and is in an interference fit with the end of the first pipeline; and/or a second sealing ring is provided on each of two ends of the second pipeline, and the second sealing ring is sleeved on the end of the second pipeline and is in an interference fit with the end of the second pipeline.

In some examples of the present disclosure, each of the first sealing ring and the second sealing ring includes a sleeve part and sealing parts, wherein the sleeve part is sleeved on the end of the first pipeline or the second pipeline, and the sealing parts are provided at an outer periphery of the sleeve part and are arranged at intervals axially.

In some examples of the present disclosure, each of the first sealing ring and the second sealing ring includes a flanging that is provided on an end of the sleeve part and is in an abutting fit with a surface of the end of the first pipeline or the second pipeline.

In some examples of the present disclosure, one of the first filter element and the second filter element is a pre-filter element, and another one of the first filter element and the second filter element is a post-filter element.

The water purifier according to the present disclosure includes a water purifier host and the aforementioned filter element assembly that is arranged on the water purifier host.

Additional aspects and advantages of the present disclosure will be set forth in part in the following description, and some of them will become apparent from the following description or learned through practice of the present disclosure.

BRIEF DESCRIPTION OF DRAWINGS

The above and/or additional aspects and advantages of this disclosure will become apparent and easy to understand from the description of embodiments in conjunction with the accompanying drawings, in which.

REFERENCE NUMERALS

Figure 1:
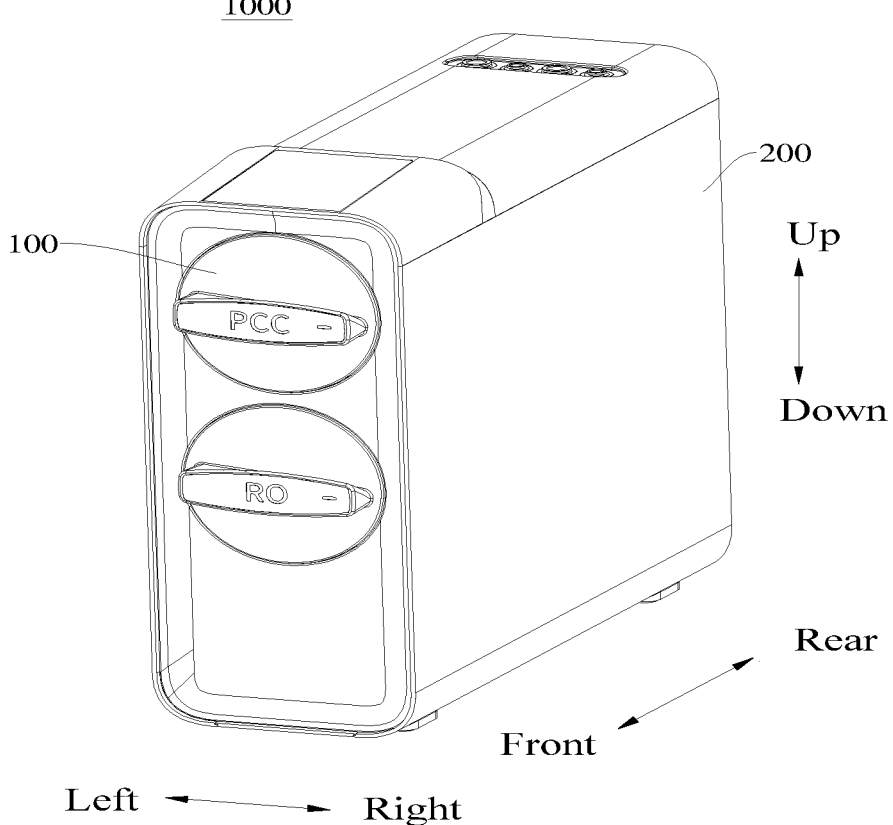
FIG. 1 is a three-dimensional view of a water purifier according to an embodiment of the present disclosure.

Water purifier 1000;

Filter element assembly 100;

First housing 10; First water port 11; Second water port 12; Third water port 13; Fourth water port 14; First connecting port 15; Second connecting port 16; Handle cover 17; Handle pad 18;

First filter element 20; First water channel 21; Second water channel 22;

Second housing 30; Fifth water port 31; Sixth water port 32; Third connecting port 33; Fourth connecting port 34; Limiting edge 35;

Second filter element 40; Third water channel 41; Fourth water channel 42; Second end cover 43; Third end cover 44;

First pipeline 50; Second pipeline 60;

First end cover 70; First through hole 71; Second through hole 72; Inner tube 73;

First sealing ring 80; Sleeve part 81; Sealing part 82; Flanging 83;

Second sealing ring 90;

Water purifier host 200.

DETAILED DESCRIPTION

The embodiments disclosed in this disclosure will be described in detail below. The embodiments described with reference to the accompanying drawings are exemplary, and the embodiments disclosed in this disclosure will be described in detail below.

A filter element assembly 100 according to embodiments of the present disclosure will be described below with reference to FIGS. 1 to 12. The filter element assembly 100 can be applied in a water purifier 1000, and functions to filter water in the water purifier 1000 so as to improve water quality and water taste. The water purifier 1000 can be a household water purifier. For example, the water purifier 1000 can be used in a household kitchen and can be an under-sink water purifier.

As shown in FIGS. 2 to 5, the filter element assembly 100 according to an embodiment of the present disclosure can include a first housing 10, a first filter element 20, a second housing 30, a second filter element 40, a first pipeline 50, and a second pipeline 60. The first housing 10 is an overall housing of the filter element assembly 100, and other components are arranged inside the first housing 10. The first housing 10 can protect a water purifier host 200 and can be assembled integrally on the water purifier host 200.

Specifically, the first filter element 20, the second housing 30, and the second filter element 40 are all arranged inside the first housing 10, and the second filter element 40 is arranged inside the second housing 30. The second housing 30 can isolate the first filter element 20 from the second filter element 40, thereby avoiding intercommunication between the water purification channels of the first filter element 20 and the second filter element 40, which would otherwise affect the water purification effect. This filter element assembly 100 can be provided with a plurality of filter elements, and the plurality of filter elements can share one first housing 10 and thus can become an integrated whole, making the filter element assembly 100 easy to assemble and reducing the volume thereof while ensuring the water purification effect.

In addition, the first housing 10 is located on an outer side of other components. Water ports corresponding to the first filter element 20 and the second filter element 40 can be provided on the first housing 10. For example, the first housing 10 has a first water port 11, a second water port 12, a third water port 13, and a fourth water port 14. The first water port 11 and the second water port 12 are spaced apart from each other, and the third water port 13 and the fourth water port 14 are spaced apart from each other. The water purifier 1000 can include a water channel board, with water channels distributed within the water channel board. Each of the four water ports can be connected to a corresponding water channel, forming a circulating path for water purification. By setting the four water ports at intervals, it is convenient to connect them to the respective water channels on the water channel board, thereby avoiding excessive concentration of related water channels, which would otherwise adversely affecting the design of the water channel board.

The four water ports can be arranged at a same end of the first housing 10. For example, a handle cover 17 is provided on the top of the first housing 10, a handle pad 18 can be correspondingly provided on the handle cover 17, and the four water ports can be provided on the bottom of the first housing 10. In this way, it can facilitate connection of each of the four water ports with a relevant water channel. The handle cover 17 is connected and fixed to the first housing 10 by spin welding.

Figure 2:
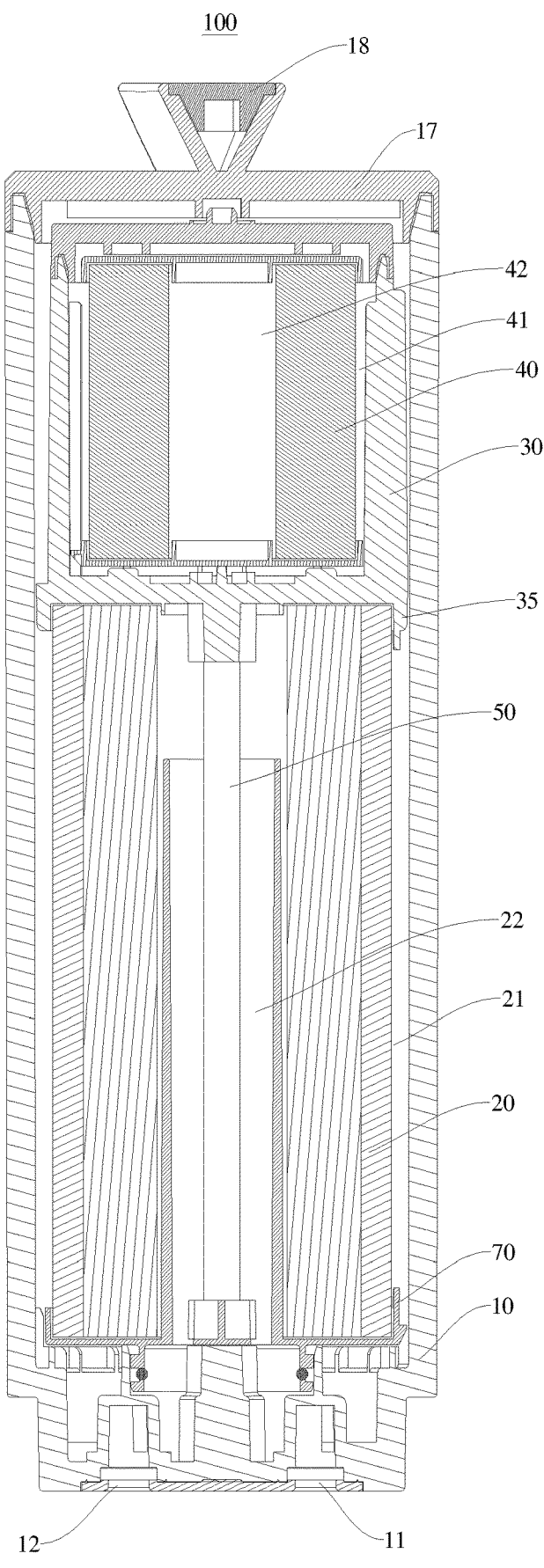
FIG. 2 is a cross-sectional view of a filter element assembly according to an embodiment of the present disclosure, which is taken along a first direction.
Figure 3:
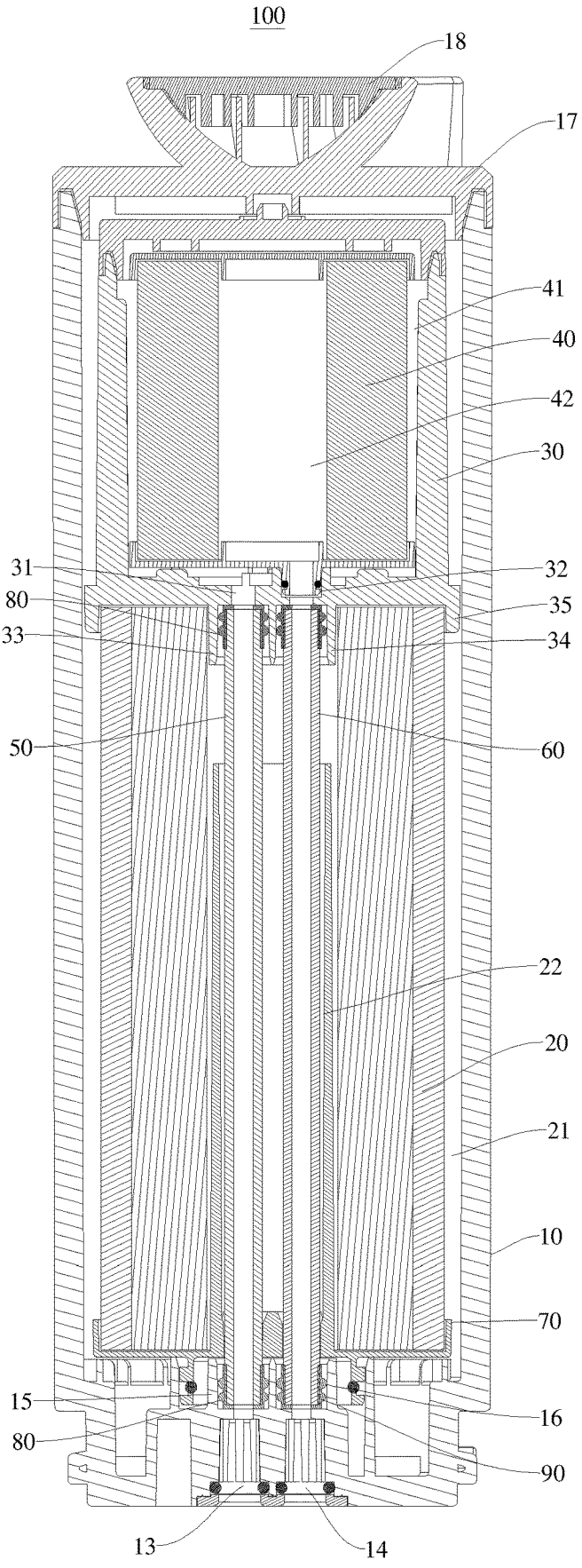
FIG. 3 is a cross-sectional view of a filter element assembly according to an embodiment of the present disclosure, which is taken along a second direction that is perpendicular to the first direction.

As shown in FIGS. 2 and 3, a first water channel 21 and a second water channel 22 are provided at an outer periphery and an inner periphery of the first filter element 20 respectively. The first water channel 21 is communicated with the first water port 11, and the second water channel 22 is communicated with the second water port 12. That is to say, water channels are formed on both an outer side and an inner side of the first filter element 20, and the water channels are communicated with the first water port 11 and the second water port 12 respectively. One of the first water port 11 and the second water port 12 is an water inlet of the first filter element 20, and another one of the first water port 11 and the second water port 12 is a water outlet of the first filter element 20. This ensures that water continuously passes through the water channels during use of the filter element assembly 100, that is, the first filter element 20 can continuously filter water. Here, the first water port 11 can be a water inlet, the first water channel 21 can be a water inflow channel, the second water port 12 can be a water outlet, and the second water channel 22 can be a water outflow channel.

The first filter element 20 can be a filter element made of a single filter material. As an example, the first filter element 20 can be a carbon rod filter element. As another example, the first filter element 20 can be a PP filter element. As yet another example, the first filter element 20 can be a filter element made of multiple filter materials. For example, the first filter element 20 can be a filter element of PP wrapped around an outer periphery of a carbon rod, i.e., the two layers of filter materials can be arranged in a manner that one filter material is sleeved on another filter material, so as to effectively filter out impurities in the water, as well as organic matters, particles, rust, residual chlorine, odor, etc. in the water. The first filter element 20 can be a pre-filter element, and the second filter element 40 can be a post-filter element. That is, water in the water purifier 1000 is first filtered by the first filter element 20, and then is filtered by the second filter element 40.

The second housing 30 is arranged at one end of the first filter element 20 that is away from the third water port 13 and the fourth water port 14, and the second filter element is arranged inside the second housing 30. That is to say, the first filter element 20 and the second filter element 40 are distributed along a length direction of the first housing 10. The first housing 10 and the second housing 30 both can be roughly cylindrical. By reasonably setting the positions of the second housing 30 and the second filter element 40, the first filter element 20 can be closer to the first water port 11 and the second water port 12, without the need for pipelines.

As shown in FIG. 3, the second housing 30 has a fifth water port 31 and a sixth water port 32 that are spaced apart from each other. A third water channel 41 and a fourth water channel 42 are arranged at an outer periphery and an inner periphery of the second filter element 40, respectively. The third water channel 41 is communicated with the fifth water port 31, and the fourth water channel 42 is communicated with the sixth water port 32. The first pipeline 50 is connected between the third water port 13 and the fifth water port 31, and is arranged in the second water channel 22. The second pipeline 60 is connected between the fourth water port 14 and the sixth water port 32, is arranged within the second water channel 22, and is spaced apart from the first pipeline 50.

Specifically, the first pipeline 50 can be an inlet pipeline, and the second pipeline can be an outlet pipeline. By connecting the first pipeline 50 between the third water port 13 and the fifth water port 31, the water flow can enter the first pipeline 50 from the third water port 13, and then flow to the fifth water port 31 through the first pipeline 50. As the third water channel 41 is communicated with the fifth water port 31, the water flow can enter the third water channel 41 in the second housing 30 through the first pipeline 50. Since the third water channel 41 and the fourth water channel 42 are arranged at the outer periphery and the inner periphery of the second element 40, respectively, the third water channel 41 can guide the water flow to the second filter element 40. The water flow enters the fourth water channel 42 after being filtered by the second filter element 40.

Furthermore, since the sixth water port 32 is communicated with the fourth water channel 42 and the second pipeline 60 is connected between the fourth water port 14 and the sixth water port 32, the water flow in the fourth water channel 42 can enter the second pipeline 60 from the sixth water port 32, flow through the second pipeline 60 to the fourth water port 14, and then flow through the fourth water port 14 to the outside environment for use by users. With this arrangement, the structure of the channel through which the water flows is simplified, avoiding a relatively complex structure of the channel, which would otherwise result in a small flow rate of water in the channel and thus cause stagnation. In addition, the water flow is not prone to flow back. In this way, the reliability of the filter element assembly 100 can be improved.

In addition, the second filter element 40 can be a carbon rod filter element, a PP filter element, or a filter element made of multiple filter materials. For example, the second filter element 40 can be a filter element of PP wrapped around an outer periphery of a carbon rod, and the two layers of filter materials can be arranged in a manner that one filter material is sleeved on another filter material, so as to effectively filter out impurities in the water, as well as organic matters, particles, rust, residual chlorine, odors, etc. in the water. Furthermore, the first filter element 20 and the second filter element 40 can be selectively set according to the user's water quality needs. The filtration effects of the first filter element 20 and the second filter element 40 on water can be in an increasing relationship, that is, the filtration effect of the first filter element 20 on water can be coarse filtration, and the filtration effect of the second filter element 40 on water can be fine filtration. When users conduct some activities that do not require high water quality, such as laundry, bathing, etc., the water purifier 1000 can directly provide a water flow that has been filtered by the first filter element to users for use. Correspondingly, when users conduct some activities with high water quality requirements, such as drinking water, cooking, etc., the water purifier 1000 can provide the water flow that has been first roughly filtered by the first filter element 20 and then finely filtered by the second filter element 40 to users for use. This not only ensures users' healthy water usage, but also avoids unnecessary use of the second filter element 40, which can extend the service life of the second filter element 40.

In addition, after the first filter element 20 filters the water flow and the filtered water flows out from the second water port 12, the water can enter a booster pump in the water purifier 1000. The booster pump can increase the pressure of the water flow, thereby increasing the flow rate of the water flow. This can prevent the water flow from flowing back due to a small flow rate when filtered by the second filter element 40, or prevent water flow stagnation in the filter element assembly 100, thereby further improving the reliability of the filter element assembly 100. Furthermore, after the water flow is pressurized by the booster pump, it can first be filtered by a filter membrane, and then enter the second filter element 40 for filtration treatment, which can further improve the water purification effect of the water purifier 1000. The filtration membrane can be a reverse osmosis (RO) filtration membrane or any other filtration membrane, such as a nanofiltration membrane or an ultrafiltration membrane.

Figure 5:
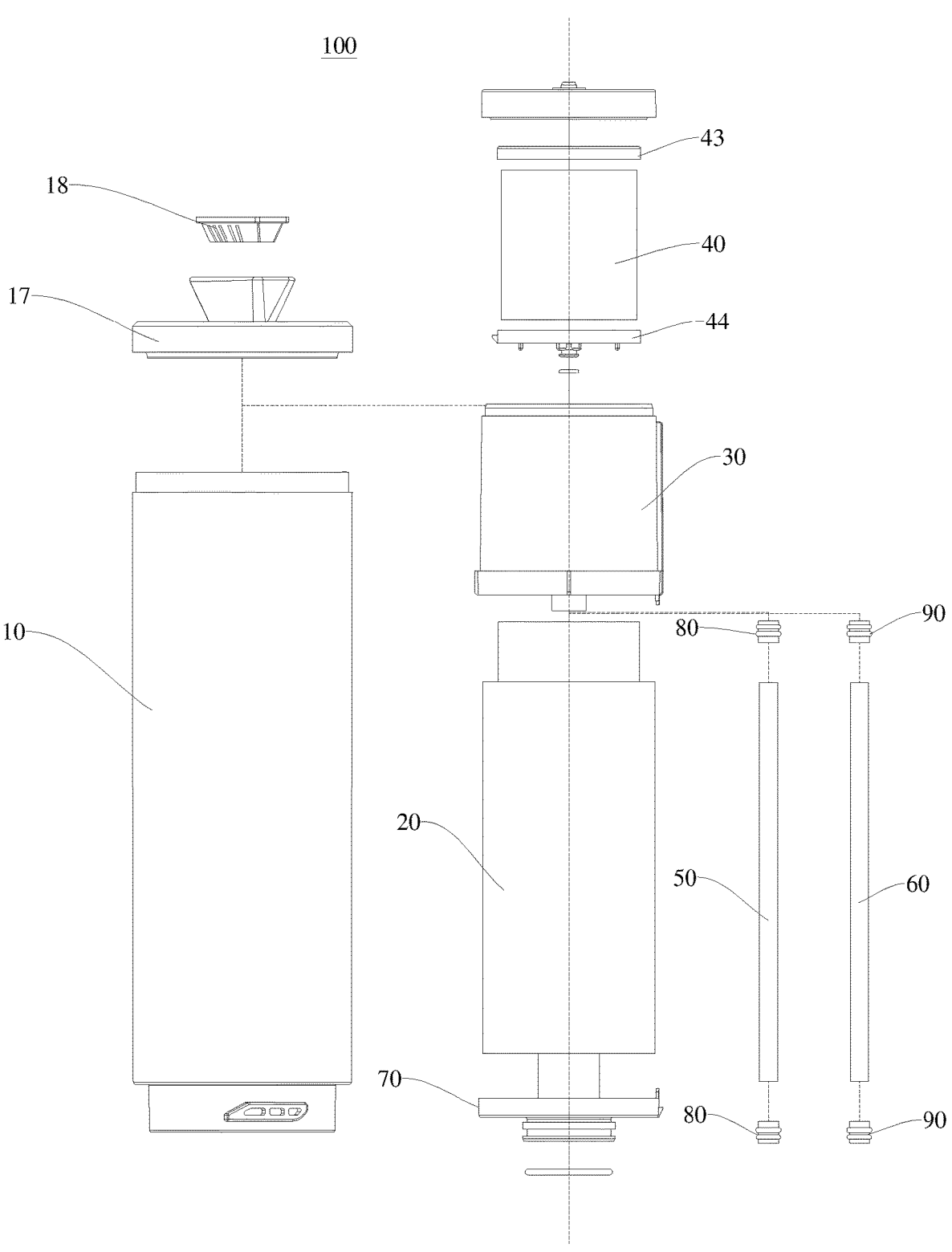
FIG. 5 is an exploded view of a filter element assembly according to an embodiment of the present disclosure.

Furthermore, as shown in FIGS. 3 and 5, the first pipeline 50 and the second pipeline 60 in the second water channel 22 are spaced apart from each other and are distributed side by side. Compared to an installation method of the traditional water purifier in which a large pipe is sleeved on a small pipe, the large pipe and the small pipe are sealed in a staggered way, and multiple ultrasonic fixations are required, the present application not only ensures smooth water flow in the second water channel 22, but also improves the space utilization rate of the filter element assembly 100. Moreover, the first pipeline 50 and the second pipeline 60 in the second water channel 22 can be bonded using an adhesive, which allows simple and direct installation of the first pipeline 50 and the second pipeline 60, without the need for other components to assist in installation. Therefore, the structure is relatively simple, the assembly materials are few, and the production efficiency of the water purifier 1000 can be improved.

Therefore, by arranging the first pipeline 50 and the second pipeline 60 side by side and spaced apart in the second water channel 22, the structure and installation of the first pipeline 50 and the second pipeline 60 are simple and convenient so as to improve the assembly efficiency of the filter element assembly 100, and the structure of the filter element assembly 100 can be more compact to improve the space utilization rate of the filter element assembly 100.

Figure 8:
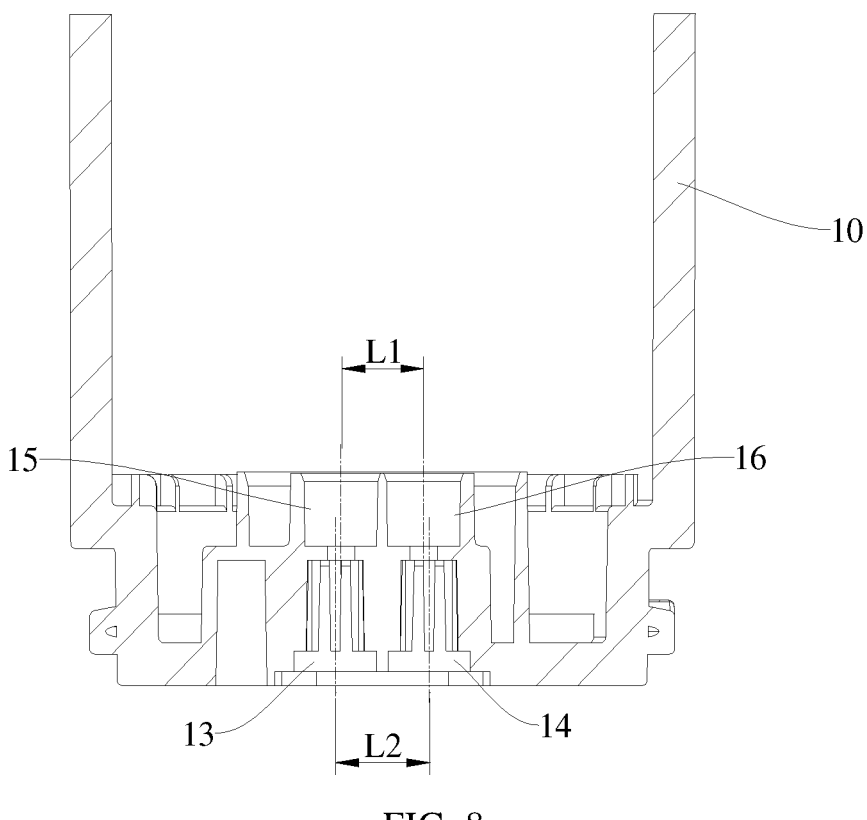
FIG. 8 is a cross-sectional view of a first housing.

Referring to FIG. 8, a distance between an axis of the first pipeline 50 and an axis of the second pipeline 60 is L1, and a distance between an axis of the third water port 13 and an axis of the fourth water port 14 is L2, where L1<L2. Specifically, since the first pipeline is arranged between the third water port 13 and the fifth water port 31 and the second pipeline 60 is arranged between the fourth water port 14 and the sixth water port 32, the distance between the axis of the first pipeline 50 and the axis of the second pipeline 60 is set to be less than the distance between the axis of the third water port 13 and the axis of the fourth water port 14. In this case, on the premise that one end of the first pipeline 50 is communicated with the third water port 13 and one end of the second pipeline 60 is communicated with the fourth water port 14, the first pipeline 50 and the second pipeline 60 are respectively eccentrically arranged relative to the third water port 13 and the fourth water port 14, thereby reducing the spacing distance between the first pipeline 50 and the second pipeline 60. This allows more compact installation of the first pipeline 50 and the second pipeline 60 in the second water channel 22, which can further improve the space utilization rate of the filter element assembly 100. In addition, this allows a larger space for arranging the first filter element 20, increasing the volume of the first filter element 20 and improving the filtering effect of the first filter element 20.

Referring to FIG. 8, the axis of the first pipeline 50 is noncollinear with the axis of the third water port 13, and the axis of the first pipeline 50 is closer to the axis of the second pipeline 60 than the axis of the third water port 13; and/or, the axis of the second pipeline 60 is noncollinear with the axis of the fourth water port 14, and the axis of the second pipeline is closer to the axis of the first pipeline 50 than the axis of the fourth water port 14. Specifically, the axis of the first pipeline 50 is arranged on a side of the axis of the third water port 13 that is closer to the axis of the second pipeline 60, and the axis of the second pipeline is arranged on a side of the axis of the fourth water port 14 that is closer to the axis of the first pipeline 50.

Compared to that only one of the first pipeline 50 and the second pipeline 60 approaches the other, making the first pipeline 50 and the second pipeline 60 approach each other can reduce the deviation of the axis of the first pipeline 50 relative to the axis of the third water port 13 and the deviation of the axis of the second pipeline 60 relative to the axis of the fourth water port 14, while the spacing distance between the first pipeline 50 and the second pipeline 60 is smaller and the first pipeline 50 and the second pipeline 60 are relatively more compact. This can improve the reliability of the communication between the first pipeline 50 and the third water port 13 and of the communication between the second pipeline 60 and the fourth water port 14, ensuring the smoothness of the water flow when entering the first pipeline 50 from the third water port 13 and the smoothness of the water flow when entering the fourth water port 14 from the second pipeline 60, thus ensuring the pressure and flow rate of the water flow, and further improving the reliability of the filter element assembly 100.

Referring to FIG. 8, the first housing 10 is provided with a first connecting port 15 at a position corresponding to the third water port 13, and a second connecting port 16 at a position corresponding to the fourth water port 14. One end of the first pipeline 50 is disposed in the first connecting port 15, and one end of the second pipeline 60 is disposed in the second connecting port 16. This can enables more stable and firmer installation of the aforementioned ends of the first pipeline 50 and the second pipeline 60 on the first housing 10 preventing displacement of the first pipeline 50 and the second pipeline 60. The displacement of the first pipeline 50 and the second pipeline 60 may cause communication failure between the aforementioned end of the first pipeline 50 and the third water port 13 and between the aforementioned end of the second pipeline 60 and the fourth water port 14, and also cause the structure of the filter element assembly 100 to be unstable. Therefore, through the above settings, the smoothness of the water flow in the filter element assembly 100 can be ensured, which can further improve the reliability of the filter element assembly 100.

Figure 9:
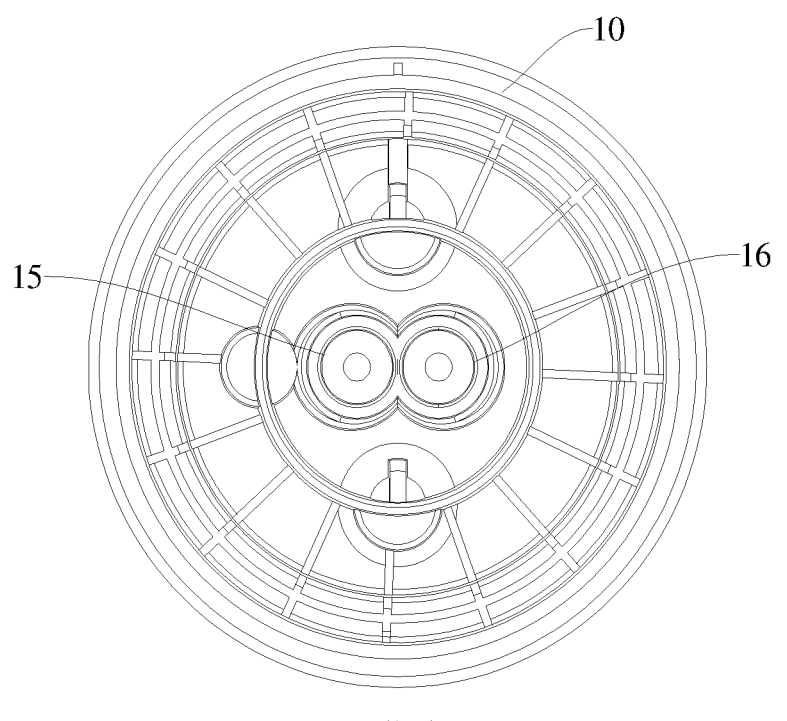
FIG. 9 is a top view of a first housing.

Furthermore, referring to FIG. 8 and FIG. 9, a distance between an axis of the first connecting port 15 and an axis of the second connecting port 16 is L1. In this way, the axis of the first connecting port 15 is collinear with the axis of the first pipeline 50, and the axis of the second connecting port 16 is collinear with the axis of the second pipeline 60. Therefore, after the first pipeline 50 and the second pipeline 60 are installed in the first connecting port and the second connecting port 16 respectively, the positioning of the first pipeline 50 and the second pipeline 60 can be directly achieved, with no need to adjust the position of the aforementioned end of the first pipeline 50 in the first connecting port 15 and the position of the aforementioned end of the second pipeline 60 in the second connecting port 16 to achieve positioning. This allows the installation of the aforementioned end of the first pipeline 50 and the aforementioned end of the second pipeline 60 to have a certain poka-yoke effect, thereby facilitating the installation of the first pipeline 50 and the second pipeline 60.

Referring to FIG. 3, the second housing 30 is provided with a third connecting port 33 at a position corresponding to the fifth water port 31, and a fourth connecting port 34 at a position corresponding to the sixth water port 32. The other end of the first pipeline 50 is disposed in the third connecting port 33, and the other end of the second pipeline 60 is disposed in the fourth connecting port 34. Specifically, since the position of the third connecting port 33 corresponds to the position of the fifth water port 31 and the position of the fourth connecting port 34 corresponds to the position of the sixth water port 32, installing the other end of the first pipeline 50 in the third connecting port 33 and installing the other end of the second pipeline 60 in the fourth connecting port 34 can not only ensure the stability and reliability of the installation of the first pipeline 50 and the second pipeline 60, but also improve the reliability of communication between the first pipeline 50 and the fifth water port 31 and between the second pipeline 60 and the sixth water port 32, thereby ensuring a smooth water flow.

Referring to FIGS. 2, 3, 5, 6, and 11, the filter element assembly 100 may further include a first end cover 70 arranged at an end of the first filter element 20 that is adjacent to the first water port 11 and the second water port 12. The first end cover 70 has a first through hole 71 and a second through hole 72 at positions corresponding to the second water channel 22. The first pipeline 50 passes through the first through hole 71, and the second pipeline 60 passes through the second through hole 72. Specifically, since the first pipeline 50 and the second pipeline 60 each have a certain length, by forming the first through hole 71 and the second through hole 72 at positions of the first end cover 70 that are corresponding to the abovementioned end of the first pipeline 50 and the abovementioned end of the second pipeline 60 respectively, and by allowing the aforementioned ends of the first pipeline 50 and the second pipeline 60 to be fixedly connected with the first connecting port 15 and the second connecting port 16 respectively after passing through the first through hole 71 and the second through hole 72 respectively, the first through hole 71 and the second through hole 72 not only have a positioning effect so as to facilitate the installation of the first pipeline 50 and the second pipeline 60, but also have a position limiting effect so as to enable more stable installation of the aforementioned end of the first pipeline 50 and the aforementioned end of the second pipeline 60 and to ensure that the aforementioned ends of the first pipeline 50 and the second pipeline 60 remain parallel as a whole after being installed, so as to prevent tilt of the first pipeline 50 and the second pipeline 60 caused by their heights. This not only facilitates subsequent assembly, but also improves the reliability of the filter element assembly 100.

Figure 7:
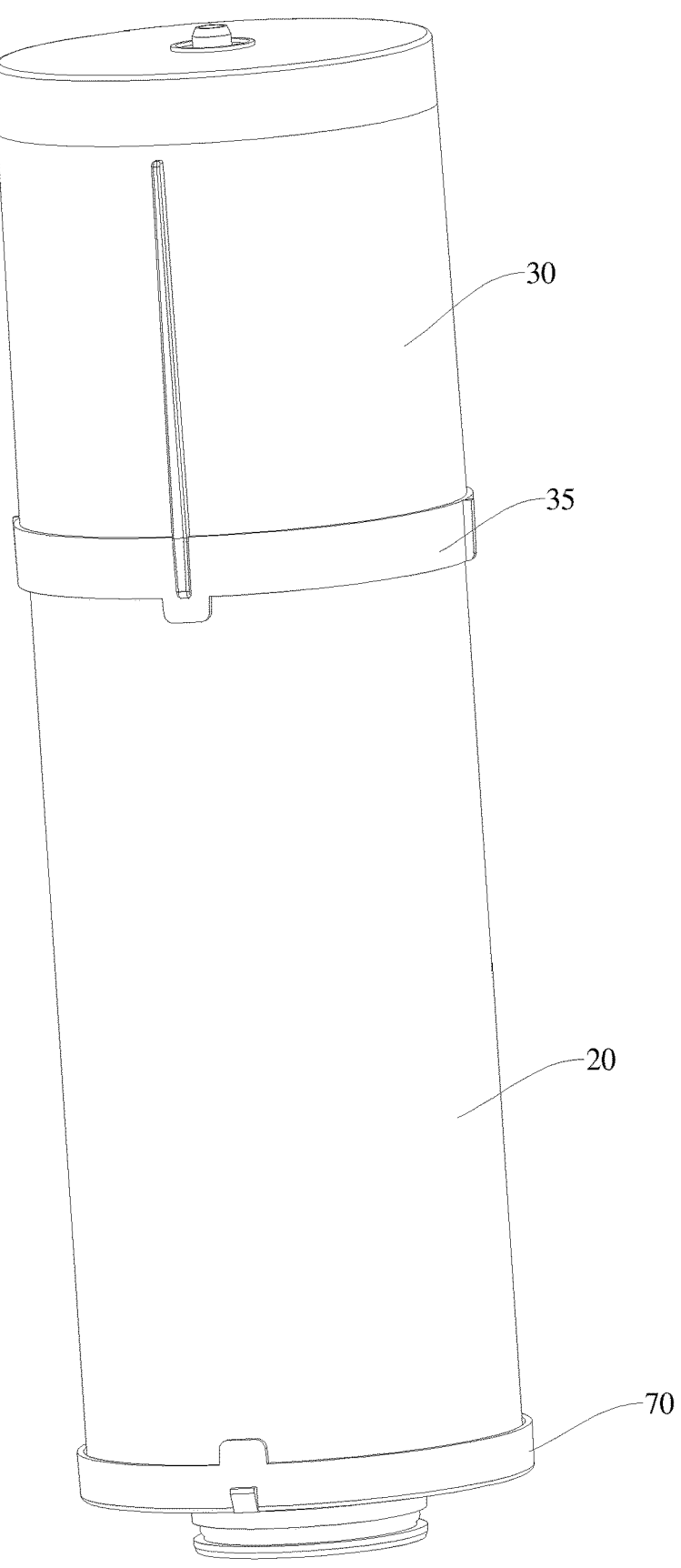
FIG. 7 is a second perspective view of a first filter element and a second housing of a filter element assembly according to an embodiment of the present disclosure.
Figure 10:
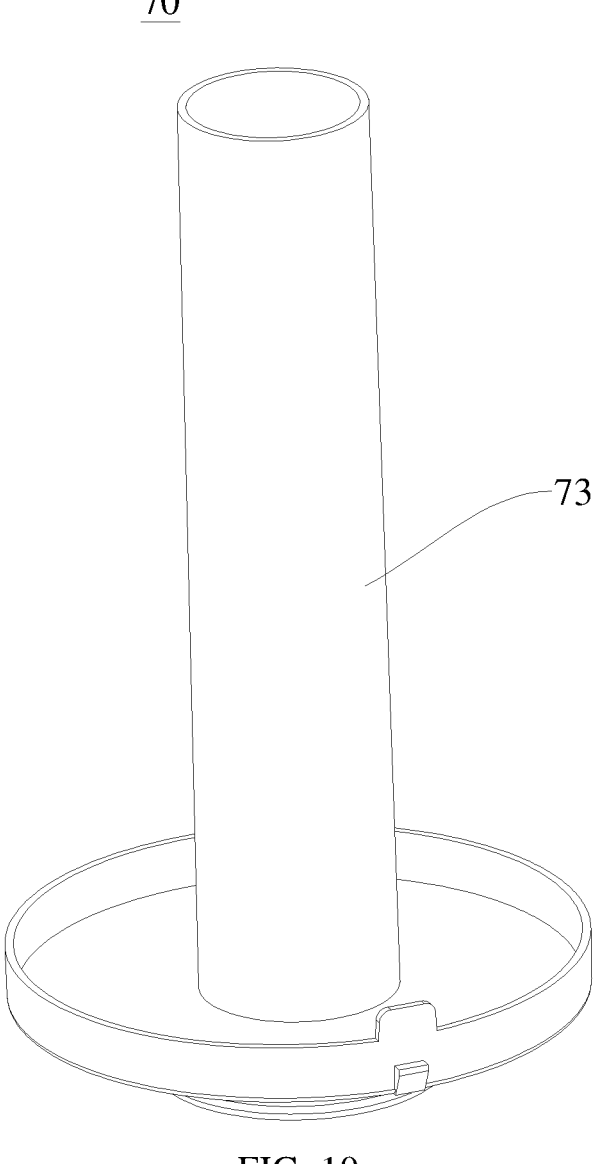
FIG. 10 is a three-dimensional view of a first end cover.
Figure 11:
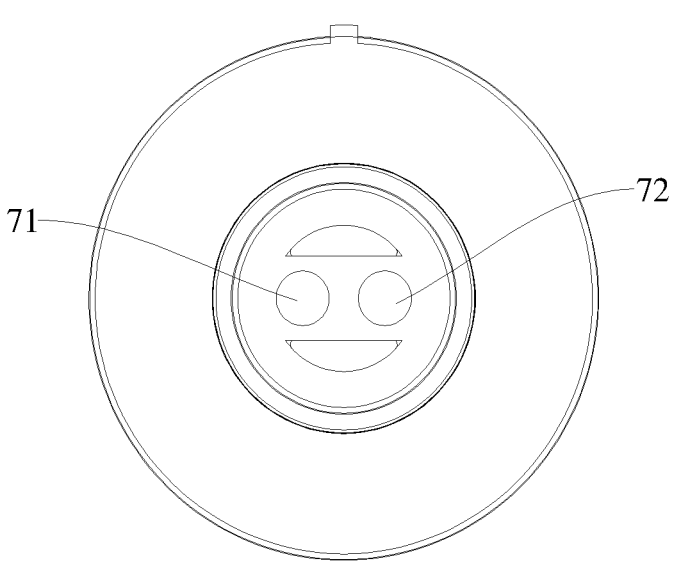
FIG. 11 is a top view of a first end cover.

Furthermore, referring to FIG. 7 and FIG. 10, a first positioning mark is provided on the first end cover 70, and a second positioning mark is provided on the first housing 10 at a position corresponding to the first positioning mark. When installing the first end cover 70 on the first housing 10, it is only necessary to arrange the first positioning mark and the second positioning mark on a same side and allow them to be aligned with each other, a correct position of the first end cover 70 can be ensured, thereby preventing inverse installation of the first end cover 70 which would otherwise cause incorrect alignment of the first through hole 71 and the second through hole 72 on the first end cover 70 with the first connecting port 15 and the second connecting port 16, for example, the first through hole 71 being aligned with the second connecting port 16 and the second through hole 72 being aligned with the first connecting port 15, which would lead to the first end cover 70 being attached and fixed at an incorrect position of the first filter element 20 and thus would lead to that the water flow cannot normally pass through the first connecting port 15 to enter the first filter element 20 for filtration treatment, as well as cannot flow out of the second connecting port 16 normally. Through the above settings, the reliability of the filter element assembly 100 can be further improved.

In addition, referring to FIG. 10, an inner tube 73 is installed on the first end cover 70. The inner tube 73 is hollow, and the first pipeline 50 and the second pipeline 60 are installed inside the inner tube 73. The inner tube 73 can separate the first pipeline 50 and the second pipeline 60 from the first filter element 20, thereby further improving the reliability of the first pipeline 50 and the second pipeline 60, ensuring the relative independence of the first pipeline 50 and the second pipeline 60 from the first filter element 20 and the second water channel 22. Moreover, the inner tube 73 can effectively guide the water that has been filtered by the first filter element 20, so as to facilitate the rapid downward flow of the filtered water from the inner tube 73 under the action of gravity.

Figure 6:
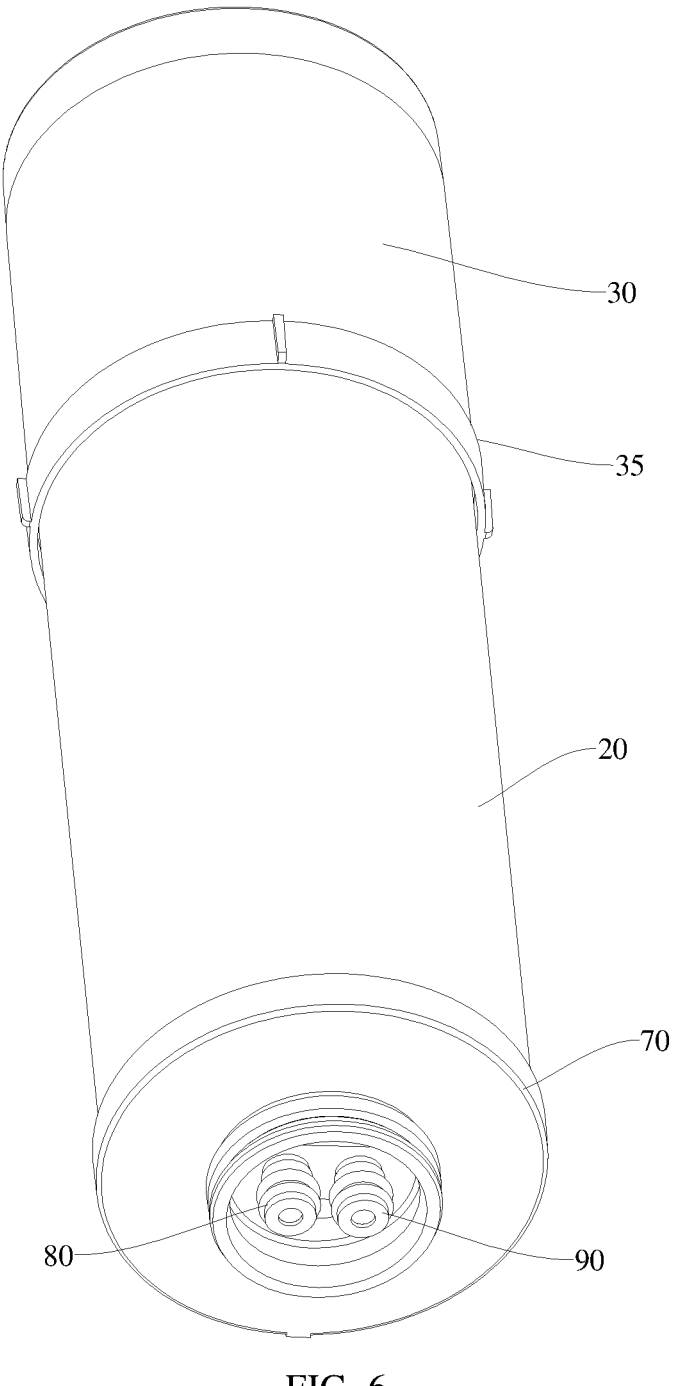
FIG. 6 is a first perspective view of a first filter element and a second housing of a filter element assembly according to an embodiment of the present disclosure.

Referring to FIG. 6, a protruding limiting edge 35 is provided at an outer periphery of an end of the second housing 30, with the end facing the first filter element 20. An end of the first filter element 20 is fixedly connected to a surface of the end of the second housing 30, and an outer periphery of the end of the first filter element 20 is fitted into the limiting edge 35. Specifically, through the position limiting and position fit between the outer periphery of the end of the first filter element 20 and the limiting edge 35 of the second housing 30, radial movement of the end of the first filter element 20 on the surface of the end of the second housing 30 can be prevented, which can further improve the stability and reliability of the installation of the first filter element 20 in the filter element assembly 100.

Furthermore, the fixed connection between the end of the first filter element 20 and the surface of the end of the second housing 30 can be achieved by adhesion using an adhesive. Compared to traditional filter element assemblies in which end covers are fixedly installed at both ends of the filter element, this arrangement eliminates the need to install an end cover at the end of the second housing 30 that faces the first filter element 20. This ensures that the first filter element 20 is stably and firmly installed in the filter element assembly 100, while further facilitating the installation and fixation of the first filter element 20 and reducing the production cost of the filter element assembly 100. In addition, the end of the first filter element 20 that is away from the second housing 30 can also be installed and fixed to the first end cover 70 through an adhesive, which can further ensure the stability and firmness of the installation of the two ends of the first filter element 20.

Furthermore, referring to FIG. 5, a second end cover 43 and a third end cover 44 are provided in the second housing 30. The second end cover 43 and the third end cover 44 are arranged at two ends of the second filter element 40, respectively, and the two ends of the second filter element 40 can be respectively fixed to the second end cover 43 and the third end cover 44 by adhesive bonding. In this way, it can ensure the stability and reliability of the installation of the second filter element 40 in the second housing 30.

In addition, a third positioning part is provided on the third end cover 44, and a fourth positioning part is provided on the second housing 30. One of the third positioning part and the fourth positioning part is a positioning protrusion, and the other is a positioning groove. By position fit of the positioning protrusion with the positioning groove, the third end cover 44 can be arranged at an accurate position. The third end cover 44 has through holes corresponding to the third connecting port 33 and the fourth connecting port 34 respectively, thereby preventing inverse installation of the third end cover 44 which would otherwise cause that the third end cover 44 is adhered and fixed to the second filter element 40 at an incorrect position and thus would cause that the water flow cannot pass through the third connecting port 33 to enter the second filter element 40 for filtration and cannot be discharged normally from the fourth connecting port 34. This setting can have a certain poka-yoke effect, making the installation of the third end cover 44 more convenient, and improving the reliability of the filter element assembly 100.

Furthermore, a sealing element is provided at an outer periphery of the third end cover 44. Due to material and installation process limitations, a gap may be present between the third end cover 44 and the second housing 30. The sealing element can seal the gap between the third end cover 44 and the second housing 30, thereby preventing water in the second housing 30 from leaking through the gap between the third end cover 44 and the second housing 30, further ensuring the reliability of the filter element assembly 100.

Referring to FIG. 5, the first pipeline 50 and the second pipeline 60 have a same structure, so that the first pipeline 50 and the second pipeline 60 can be interchangeable without the need to separate the production of the first pipeline 50 from the production of the second pipeline 60. This not only facilitates the manufacturing of the first pipeline 50 and the second pipeline 60, but also reduces production costs. Furthermore, during the installation process of the first pipeline 50 and the second pipeline 60, there is no need to distinguish the two, which can further improve the production efficiency of the filter element assembly 100. Furthermore, the first pipeline 50 and the second pipeline 60 can be injection molded parts, extruded parts, etc., which can allow simple and convenient production of the first pipeline 50 and the second pipeline 60. In addition, a plurality of sets of the first pipeline 50 and the second pipeline 60 can be provided, which can improve the filtration efficiency of the filter element assembly 100.

Of course, a connecting rib can be connected between the first pipeline 50 and the second pipeline 60. The first pipeline 50, the second pipeline 60, and the connecting rib are formed integrally as one structural piece, and the connecting rib is connected between the first pipeline 50 and the second pipeline 60 in the space therebetween. The connecting rib can prevent relative displacement between the first pipeline 50 and the second pipeline 60, and can maintain the first pipeline 50 and the second pipeline 60 parallel to each other, improving the reliability of the filter element assembly 100. In addition, integrally forming the first pipeline 50, the second pipeline 60, and the connecting rib as one structural piece not only facilitates the production of the first pipeline 50, the second pipeline 60, and the connecting rib, but also simplifies the production process. Moreover, there is no need to install the connecting rib after the installation of the first pipeline 50 and the second pipeline 60. This not only reduces the assembly difficulty of the filter element assembly 100, but also improves the stability of the connection among the first pipeline 50, the second pipeline 60 and the connecting rib.

Figure 4:
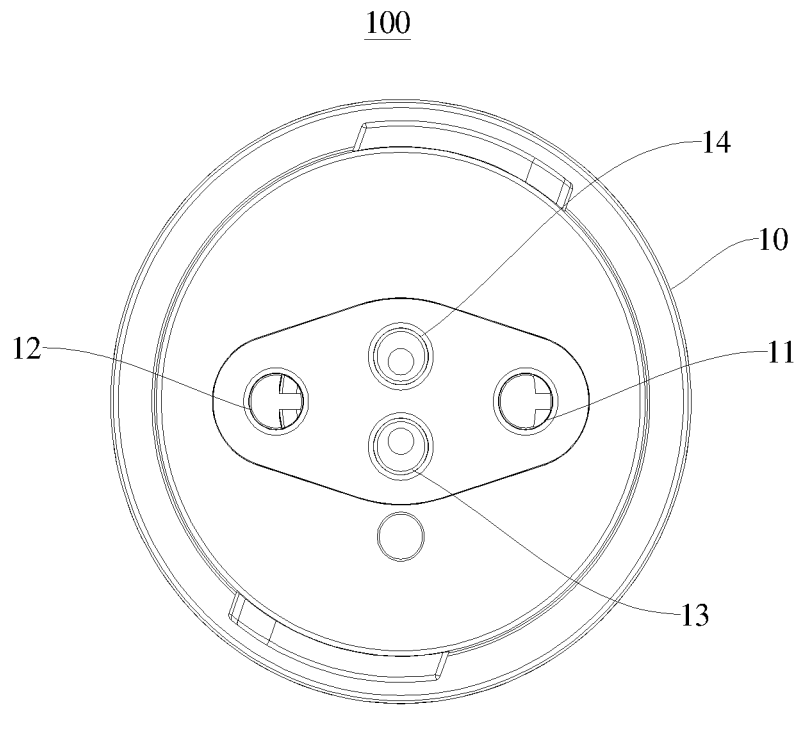
FIG. 4 is a bottom view of a filter element assembly according to an embodiment of the present disclosure.

Referring to FIG. 4, the first water port 11, the second water port 12, the third water port 13, and the fourth water port 14 are arranged at an axial end of the first housing 10 and are spaced apart from one another. The first water port 11 is spaced apart from the second water port 12 in a first direction and the third water port 13 is spaced apart from the fourth water port 14 in a second direction, with an included angle between the first direction and the second direction. Specifically, considering the overall cylindrical shape of the filter element assembly 100, by setting that the first water port 11 and the second water port 12 are spaced apart in the first direction, the third water port 13 and the fourth water port 14 are spaced apart in the second direction, and an included angle is present between the first direction and the second direction, the structure of the filter element assembly 100 is more compact, and the first water port 11, the second water port 12, the third water port 13 and the fourth water port 14 are prevented from being collinear in a certain direction, which would otherwise cause a too large size of the filter element assembly 100 in the direction, result in idle space in other directions, increase the diameter of the filter element assembly 100, and waste spaces in the other directions of the filter element assembly 100. Therefore, the filter element assembly 100 can have a more compact structure and a more reasonable structural layout, optimizing the structural design of the filter element assembly 100.

Referring to FIG. 4, the included angle may be 90°. Setting the included angle as can provide more uniform and reasonable spacings of the third water port 13 and the fourth water port 14 from the first water port 11 and the second water port 12. For example, it can prevent that the distance between the third water port 13 and the first water port 11 is long and the distance between the third water port 13 and the second water port 12 is short, which would otherwise cause that the size of the water channel corresponding to the third water port 13 cannot be too large due to the long distance between the third water port 13 and the first water port 11, and thus would otherwise result in a decrease in water flow rate and a waste of space between the third water port 13 and the second water port 12. Therefore, the filter element assembly 100 can have a more compact structure and a more reasonable structural layout, optimizing the structural design of the filter element assembly 100.

Referring to FIG. 3 and FIG. 6, a first sealing ring 80 is provided on each of the two ends of the first pipeline 50, and the first sealing ring 80 is sleeved on the end of the first pipeline 50 and is in an interference fit with the end of the first pipeline 50. A second sealing ring 90 is provided on each of the two ends of the second pipeline 60, and the second sealing ring 90 is sleeved on the end of the second pipeline 60 and is in an interference fit with the end of the second pipeline 60. Specifically, considering that the two ends of the first pipeline are fixedly connected to the first connecting port 15 and the third connecting port 33, respectively, the two ends of the second pipeline 60 are fixedly connected to the second connecting port 16 and the fourth connecting port 34, respectively, the two ends of the first pipeline 50 are connected between the first connecting port 15 and the third connecting port 33, and the two ends of the second pipeline 60 are connected between the second connecting port 16 and the fourth connecting port 34, it is not possible to achieve complete mutual tight attachment and complete sealing due to material and installation process limitations, and thus may cause water leakage when the water flows into or out of the first pipeline 50 and the second pipeline 60.

Therefore, by providing the first sealing ring 80 at each of the two ends of the first pipeline 50 and providing the second sealing ring 90 at each of the two ends of the second pipeline 60, sealing can be formed between the two ends of the first pipeline 50 and the first and second connecting ports 15, 33, and between the two ends of the second pipeline 60 and the second and fourth connecting ports 16, 34, thereby preventing water leakage and further improving the structural reliability of the filter element assembly 100.

In addition, after the first sealing ring 80 and the second sealing ring 90 are respectively fixedly connected to the two ends of the first pipeline 50 and the two ends of the second pipeline 60 through interference fit, the two ends of the first pipeline 50 are respectively fixedly connected to the first connecting port 15 and the third connecting port 33 through interference fit, and the two ends of the second pipeline 60 are respectively fixedly connected to the second connecting port 16 and the fourth connecting port 34 through interference fit. Compared to the installation and fixation method of the inlet and outlet water pipes in traditional water purifiers, the present application can ensure the stable and secure installation of the first pipeline 50 and the second pipeline 60 and enable simple and convenient installation of the first pipeline 50 and the second pipeline 60, which not only simplifies the installation process without the need for other components to assist in installation, but also simplifies the structure and achieves weight reduction of the filter element assembly 100.

Figure 12:
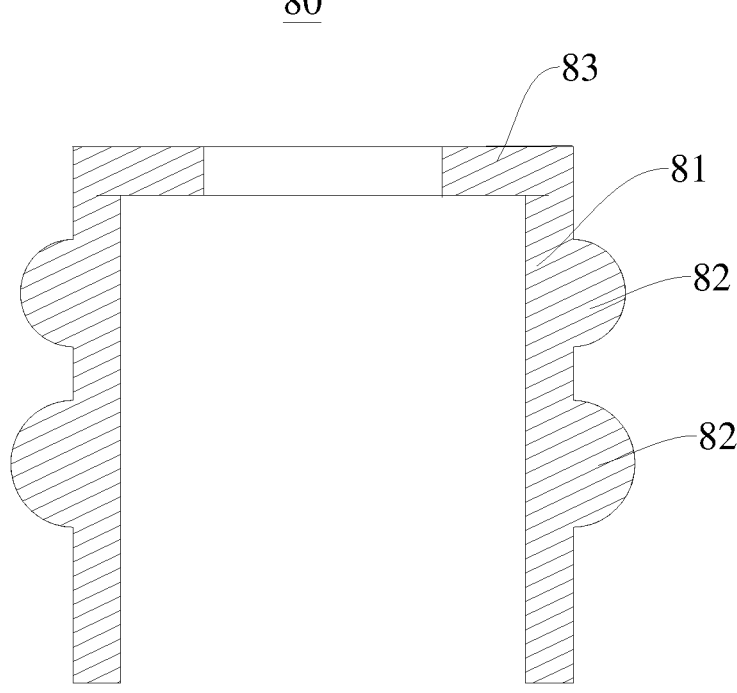
FIG. 12 is a cross-sectional view of a first sealing ring.

Referring to FIG. 12, each of the first sealing ring 80 and the second sealing ring includes a sleeve part 81 and sealing parts 82. The sleeve part 81 is sleeved on the end of the first pipeline 50 or the second pipeline 60, and the sealing parts 82 are provided on the outer periphery of the sleeve part 81 and are arranged at intervals axially. Specifically, the sleeve part 81 is sleeved on the end of the first pipeline 50 or the second pipeline 60, which ensures the stability of the connection between the sleeve part 81 and the ends of the first pipeline 50 or the second pipeline 60. The sealing part 82 is sleeved on the outer periphery of the sleeve part 81, which allows that the sealing part 82 closely contacts the peripheral wall of the connecting port, thereby blocking the leakage flow of water between the two ends of the first pipeline 50 and the second pipeline 60 and the connecting ports, thus ensuring the sealing performance of the first sealing ring 80 and the second sealing ring 90, and ensuring the reliability of the first sealing ring 80 and the second sealing ring 90.

In addition, each of the first sealing ring 80 and the second sealing ring 90 can be an elastic sealing ring, and an inner periphery diameter of the first sealing ring 80 is smaller than the diameter of the two ends of the first pipeline 50, and an inner periphery diameter of the second sealing ring 90 is smaller than the diameter of the two ends of the second pipeline which can ensure stable and firm connection between the first sealing ring 80 and the first pipeline 50 and between the second sealing ring 90 and the second pipeline 60. An outer periphery diameter of each of the first sealing ring 80 and the second sealing ring 90 is larger than a diameter of the corresponding connecting port, which can enable each of the first sealing ring 80 and the second sealing ring 90 to be in close abutting fit with the connecting port, thereby further improving the sealing performance of the first sealing ring 80 and the second sealing ring 90. The first sealing ring 80 and the second sealing ring 90 can be latex sealing rings, silicone sealing rings, or rubber sealing rings.

Referring to FIG. 12, each of the first sealing ring 80 and the second sealing ring may include a flanging 83 that is provided at an end of the sleeve part 81 and is in an abutting fit with a surface of the end of the first pipeline 50 or the second pipeline 60. Specifically, the tight radial abutting fit between the sealing part 82 and the connecting port can enable the sealing part 82 to seal between the first pipeline 50 and the connecting port and to seal between the second pipeline 60 and the connecting port. However, gaps may be present between the two ends of each of the first pipeline 50 and the second pipeline 60 and the corresponding water ports, which can also cause water leakage. By setting the flanging 83 that is in an abutting fit with the surface of the end of the first pipeline 50 or the second pipeline 60, circumferential sealing of the two ends of each of the first pipeline 50 and the second pipeline 60 with the corresponding water ports can be achieved to ensure that water flows from the pipelines to the corresponding water ports or from the water ports to the corresponding pipelines completely, preventing water leakage from the gap between the pipeline and the water port, and further ensuring the structural reliability of the filter element assembly 100.

Referring to FIG. 1 and FIGS. 2 to 5, the water purifier 1000 according to an embodiment of the present disclosure can mainly include a water purifier host 200 and the filter element assembly 100. The filter element assembly 100 is arranged on the water purifier host 200, and water that has been filtered by the first filter element 20 can directly flow out of the water purifier 200 for user use, or can be pressurized by a booster pump in the water purifier host 200, filtered through a reverse osmosis (RO) membrane and then through the second filter element 40, and then flow out of the water purifier host 200 for user use. This not only allows the water purifier 1000 to provide users with water of different qualities to meet their needs when carrying out activities with different water quality requirements, but also avoids reducing the lifespan of the second filter element 40. In addition, the water purifier host 200 can protect the filter element assembly 100, prevent external impact or foreign objects from damaging the filter element assembly 100, and extend the service life of the filter element assembly 100.

In the description of this disclosure, it should be understood that the orientation or positional relationship indicated by the terms "center", "longitudinal", "lateral", "length", "width", "thickness", "up", "down", "front", "rear", "left", "right", "vertical", "horizontal", "top", "bottom", "inner", "outer", "clockwise", "counterclockwise", "axial", "radial", "circumferential", etc., is based on the orientation or positional relationship shown in the accompanying drawings, and is only for the convenience of describing the present disclosure and simplifying the description, but is not intended to indicate or imply that the device or component referred to must have a specific orientation, be constructed and operated in a specific orientation, and therefore cannot be understood as a limitation to the present disclosure.

In the description of this specification, the description with reference to the terms "an embodiment", "some embodiments", "illustrative embodiments", "examples", "specific examples", or "some examples" indicates that the specific features, structures, materials, or characteristics described in conjunction with the embodiment or example are included in at least one embodiment or example of this disclosure. In this specification, the illustrative expressions of the above terms do not necessarily refer to the same embodiment or example.

While embodiments of the present disclosure have been shown and described, it will be understood by those of ordinary skill in the art that various changes, modifications, substitutions and variants can be made to the embodiments without departing from the principle and sprite of the disclosure, the scope of which is defined by the claims and their equivalents.

What is claimed is:

1. A filter element assembly, comprising:
a first housing having a first water port, a second water port, a third water port, and a fourth water port, wherein the third water port is spaced apart from the fourth water port;
a first filter element arranged inside the first housing, a first water channel and a second water channel being provided at an outer periphery and an inner periphery of the first filter element respectively, wherein the first water channel is communicated with the first water port, and the second water channel is communicated with the second water port;
a second housing arranged inside the first housing and arranged at an end of the first filter element that is away from the third water port and the fourth water port, the second housing having a fifth water port and a sixth water port that are spaced apart from each other;
a second filter element arranged inside the second housing, a third water channel and a fourth water channel being provided at an outer periphery and an inner periphery of the second filter element respectively, wherein the third water channel is communicated with the fifth water port, and the fourth water channel is communicated with the sixth water port;
a first pipeline connected between the third water port and the fifth water port and arranged in the second water channel;
a second pipeline connected between the fourth water port and the sixth water port, wherein the second pipeline is arranged within the second water channel and is spaced apart from the first pipeline; and
a first end cover arranged at an end of the first filter element that is adjacent to the first water port and the second water port, the first end cover having a first through hole and a second through hole at positions corresponding to the second water channel, the first pipeline passing through the first through hole and the second pipeline passing through the second through hole,
wherein a second end cover and a third end cover are provided within the second housing, the second end cover and the third end cover are arranged at two ends of the second filter element respectively, a third positioning part is provided on the third end cover, a fourth positioning part is provided on the second housing, one of the third positioning part and the fourth positioning part is a positioning protrusion, and another one of the third positioning part and the fourth positioning part is a positioning groove, and the third end cover has through holes corresponding to the third connecting port and the fourth connecting port.

2. The filter element assembly according to claim 1, wherein a distance between an axis of the first pipeline and an axis of the second pipeline is L1, and a distance between an axis of the third water port and an axis of the fourth water port is L2, where L1<L2.

3. The filter element assembly according to claim 2, wherein:
the axis of the first pipeline is noncollinear with the axis of the third water port, and the axis of the first pipeline is closer to the axis of the second pipeline than the axis of the third water port; and/or
the axis of the second pipeline is noncollinear with the axis of the fourth water port, and the axis of the second pipeline is closer to the axis of the first pipeline than the axis of the fourth water port.

4. The filter element assembly according to claim 2, wherein the first housing is provided with a first connecting port at a position corresponding to the third water port and a second connecting port at a position corresponding to the fourth water port, with one end of the first pipeline arranged in the first connecting port and one end of the second pipeline arranged in the second connecting port,
wherein a distance between an axis of the first connecting port and an axis of the second connecting port is L1.

5. The filter element assembly according to claim 4, wherein the second housing is provided with a third connecting port at a position corresponding to the fifth water port and a fourth connecting port at a position corresponding to the sixth water port, with another end of the first pipeline arranged in the third connecting port and another end of the second pipeline arranged in the fourth connecting port.

6. The filter element assembly according to claim 1, wherein an inner tube is installed on the first end cover, the inner tube is hollow, and the first pipeline and the second pipeline are installed inside the inner tube.

7. The filter element assembly according to claim 1, wherein a protruding limiting edge is provided at an outer periphery of an end of the second housing that faces the first filter element, the end of the first filter element being fixedly connected to a surface of the end of the second housing, and the outer periphery of the first filter element being fitted into the limiting edge.

8. The filter element assembly according to claim 1, wherein the first pipeline and the second pipeline have a same structure.

9. The filter element assembly according to claim 1, wherein a connecting rib is connected between the first pipeline and the second pipeline, and the first pipeline, the second pipeline, and the connecting rib are integrally formed as one structural piece.

10. The filter element assembly according to claim 1, wherein the first water port, the second water port, the third water port, and the fourth water port are spaced apart from one another at an axial end of the first housing, the first water port is spaced apart from the second water port in a first direction, and the third water port is spaced apart from the fourth water port in a second direction, with an included angle formed between the first direction and the second direction.

11. The filter element assembly according to claim 10, wherein the included angle is 90°.

12. The filter element assembly according to claim 1, wherein:

a first sealing ring is provided on each of two ends of the first pipeline, and the first sealing ring is sleeved on the end of the first pipeline and is in an interference fit with the end of the first pipeline; and/or a second sealing ring is provided on each of two ends of the second pipeline, and the second sealing ring is sleeved on the end of the second pipeline and is in an interference fit with the end of the second pipeline.

13. The filter element assembly according to claim 12, wherein each of the first sealing ring and the second sealing ring comprises a sleeve part and sealing parts, wherein the sleeve part is sleeved on the end of the first pipeline or the second pipeline, and the sealing parts are provided at an outer periphery of the sleeve part and are arranged at intervals axially.

14. The filter element assembly according to claim 13, wherein each of the first sealing ring and the second sealing ring comprises a flanging that is provided on an end of the sleeve part and is in an abutting fit with a surface of the end of the first pipeline or the second pipeline.

15. The filter element assembly according to claim 1, wherein one of the first filter element and the second filter element is a pre-filter element, and another one of the first filter element and the second filter element is a post-filter element.

16. A water purifier, comprising:

a water purifier host; and the filter element assembly according to claim 1, wherein the filter element assembly is arranged on the water purifier host.

17. The water purifier according to claim 16, wherein a distance between an axis of the first pipeline and an axis of the second pipeline is L1, and a distance between an axis of the third water port and an axis of the fourth water port is L2, where L1<L2.

18. The water purifier according to claim 17, wherein:

the axis of the first pipeline is noncollinear with the axis of the third water port, and the axis of the first pipeline is closer to the axis of the second pipeline than the axis of the third water port; and/or the axis of the second pipeline is noncollinear with the axis of the fourth water port, and the axis of the second pipeline is closer to the axis of the first pipeline than the axis of the fourth water port.

\* \* \* \* \*